Dec. 7, 1954  J. R. AUSTIN  2,696,314
MATERIAL HANDLING MACHINE
Filed Oct. 18, 1951  2 Sheets-Sheet 1
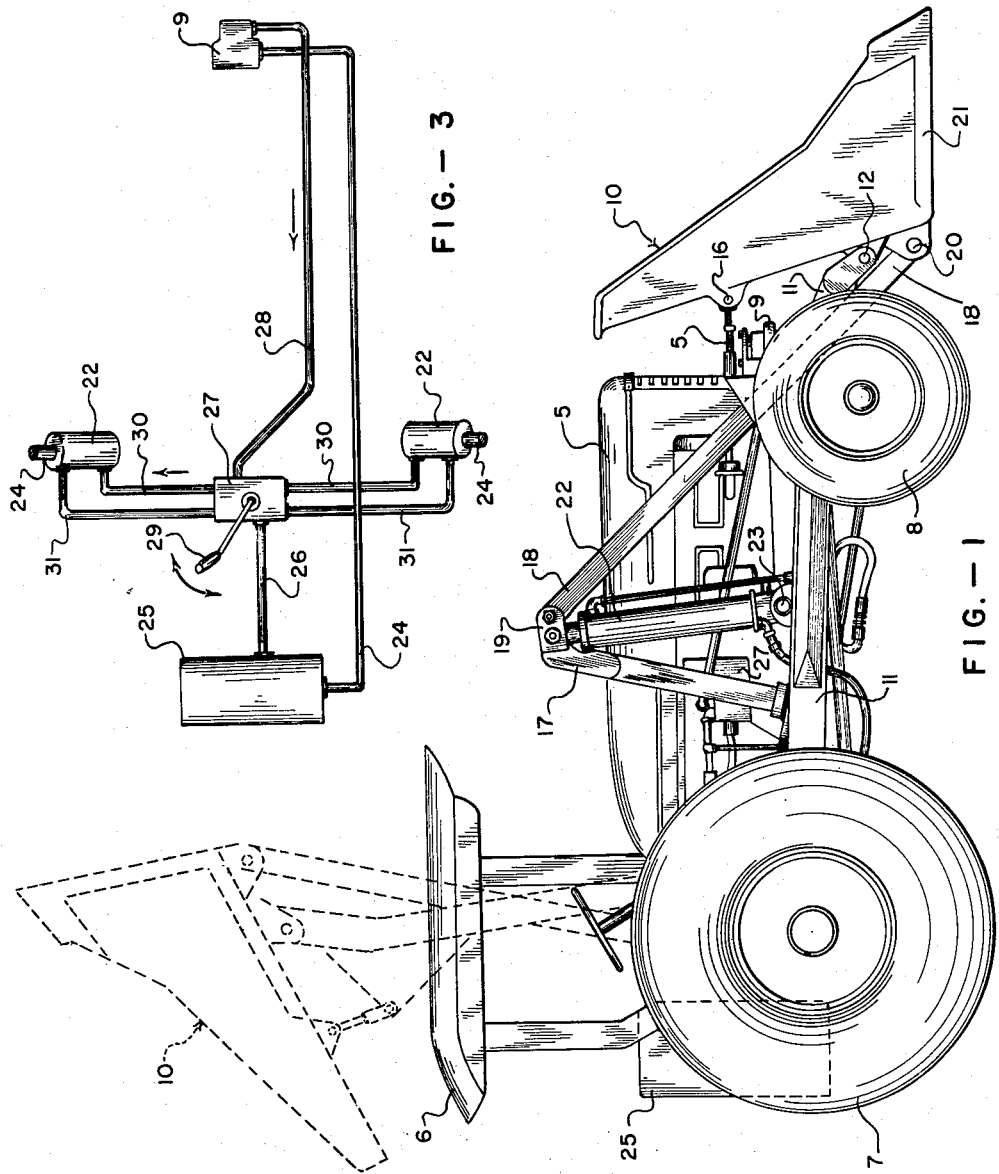
INVENTOR
John R. Austin
BY
ATTORNEY Dec. 7, 1954 J. R. AUSTIN 2,696,314
MATERIAL HANDLING MACHINE
Filed Oct. 18, 1951 2 Sheets-Sheet 2
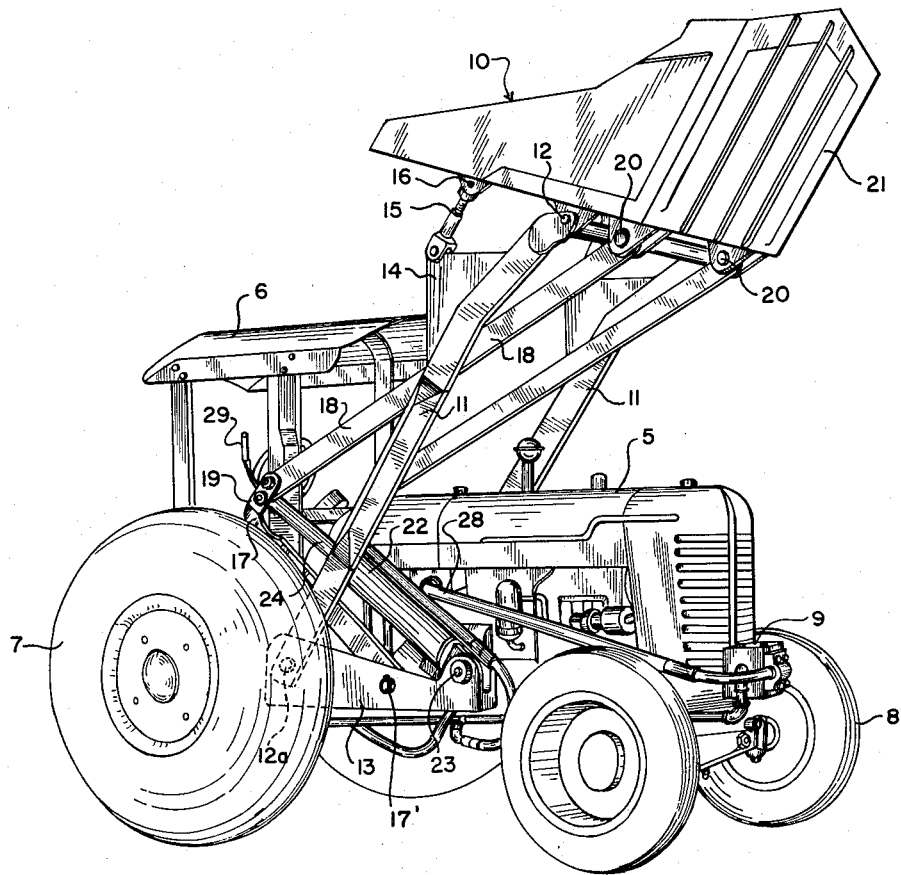
FIG. — 2
*INVENTOR*
John R. Austin
BY
ATTORNEY United States Patent Office 2,696,314
Patented Dec. 7, 1954

1

2,696,314

MATERIAL HANDLING MACHINE

John R. Austin, Denver, Colo.

Application October 18, 1951, Serial No. 251,935

6 Claims. (Cl. 214—140)

This invention relates to new and useful improvements in material handling and more particularly to overshot loaders for tractors of any type, and which are dozed into the load ahead, raised in a straight overhead arc over the operator cab and dumped into a trailer hauling unit behind the tractor.

More particularly, this invention has for its object to provide a lower cost overshot loader attachment for wheeled and other type tractors which can be readily installed by any mechanic. The present application contains subject matter related to my application Serial No. 144,327, filed Feburary 15, 1950, for Overshot Loader, now abandoned.

Another important object of the invention is to provide a hydraulic power unit and controls whereby the bucket or scoop can be rapidly moved overhead in an arc, held in any position along this arc, moved on over the tractor cab and dumped and rapidly moved back to dozing position ahead of the tractor.

Another object of the invention is to provide a rugged and simple power system of levers for moving the bucket and including a rearwardly inclined hydraulic power unit whose arc of movement is controlled by an arc controlling lever connected at its upper end to a power arm to form an elbow to which the power of the hydraulic unit is applied.

A further object is to provide a hydraulic power control including reservoir, valve and pump to which oil from the reservoir is fed by gravity to the pump, and the valve being of such construction that when oil is being pumped to either end of the hydraulic cylinder, oil from the opposite end thereof is being returned to the reservoir to permit rapid piston and bucket movement in either direction.

Other objects and advantages of the invention will become apparent during the course of the following description.

In the acompanying drawings forming a part of the application and wherein like numerals are employed to designate like parts throughout the several views;

Fig. 1 is a side elevation of a wheeled tractor with the overshot loader atachment shown attached thereto; the full lines showing the bucket in dozing position while the dotted lines show it in dumping position;

Fig. 2 is a perspective view of the tractor with the bucket in an intermediate position; and Fig. 3 is a diagrammatic top plan view of the hydraulic power system.

Before explaining in detail the present invention it is to be understood that the invention is not limited in its application to the details of construction and arrangement of parts illustrated in the acompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now more particularly to the drawings wherein for the purpose of illustration, the preferred example of the invention is shown, the numeral 5 designates a motor driven tractor having an operator's cab 6, rear wheels 7, front wheels 8, and customary chassis to the front of which is attached an oil pump 9. This pump forms part of the hydraulic power system to be presently described and is provided with a propeller shaft suitably coupled with a driven shaft of the tractor.

A bucket or scoop 10 of generally conventional construction is normally arranged at the front of the tractor as shown in Fig. 1 in bull dozing or loading position to be pushed or dozed by the forward movement of the tractor to fill the scoop with material to be moved. This bucket or scoop 10 is supported upon the tractor at each side thereof by corresponding power linkage, each of which includes a bucket or yoke arm or lever 11 pivoted both at its forward end at 12 to the bucket 10 as shown, and at its rear end at 12a to a casting 13 which is secured to the tractor chassis. The front end of each yoke arm 11 is slightly offset downwardly as shown, and is provided with an extension 14 to which is pivoted one end of an adjustable screw link 15, the other end of which is pivotally connected at 16 to the back of the bucket 10 to adjustably hold it in operative position. This bucket arm 11 causes the bucket 10 to move in a straight overhead arc.

The power linkage also includes a pair of power links or arms 17 and 18 pivoted at their upper converging ends to form an elbow which is normally tilted or cocked slightly rearwardly of the tractor when in dozing position, as seen in Fig. 1. This tilted relation of the elbow joint is effected by forming the upper end of arm 17 with a rigid angular extension 19, the free end of which is pivoted to the upper end of arm 18. This extension 19 can be an integral part of arm 17 or a separate piece welded thereto. The lower end of the arm 17 is pivoted to the casting 13 as at 17', while the forward and lower end of arm 18 is pivoted at 20 to the lower back edge of the blade 21 of the bucket.

The hydraulic power unit for swinging the linkage on each side of the tractor consists of a rearwardly tilted hydraulic cylinder 22 pivoted at its lower end in ears 23 of the casting 13, as best seen in Fig. 2. A piston is slidably mounted in this cylinder and has a stem 24, the free upper end of which is pivoted to the rigid angular extension 19 inwardly of its outer end and between the upper converging ends of the arms 17 and 18 to power pull the arms 18 rearwardly as the arms 17 control the arc in which the rear ends of the arms 18 move.

It will be noted that the three pivots 12a, 17' and 23 are all mounted in casting 13 approximately in a plane common to the vehicle axles. It will also be noted that the sum of the lengths of each pair of arms 17 and 18 is greater than the length of each bucket arm 11 for greater simplification of arrangement of the essential parts of this attachment and ease of conversion of an ordinary tractor into a lower cost over-shot loader. However, the arms 17 are of less length than the arms 18 whereby the over-all length of the hydraulic cylinders 22 can be reduced and its force application is arranged in the same plane of these two arms and at the far fulcrum ends thereof. It will be further noted that the forward end of the arm 11 is pivoted to the bucket slightly above the pivot 20 and that both of these pivots are disposed beneath the plane of the front axle when the bucket is in dozing position. With this arrangement of levers and arms, it will be seen that the invention can be easily applied to any vehicle as an attachment in proper dozing position to receive the maximum push, the bucket will swing overhead clear of any cab construction to discharge rearwardly thereof and will rigidly support the bucket overhead while the vehicle is being maneuvered to dump the bucket wherever desired.

Referring to Fig. 3 where the hydraulic control of the two hydraulic units 22 is shown, it will be noted that the intake for the pump 9 is connected by an inlet conduit 24 which is connected to the bottom of an oil reservoir or tank 25 located higher than the pump and at the back of the cab to feed the pump by gravity. This tank 25 is connected about half way of its length by a return conduit 26 to a three-way valve 27. An outlet conduit 28 connects the pump 9 with the valve 27, which when its control valve handle 29 is in neutral position enables communication to be established between the conduits 26 and 28 to permit oil to flow from the pump, through the valve 27 directly into the reservoir 25 without entering conduits 30 and 31 and thence back to the pump for free circulation. Conduits 30 and 31 from the bottom and top of the hydraulic cylinder 22 on each side of the tractor communicate with the valve 27, so that when the valve handle 29 is pulled back from its neutral position to raise the bucket scoop 10 to unload the scoop over the back of the tractor, the oil under pressure will flow from the pump 9 through the conduit 28 and three-way valve 27 into the conduits 30 under the pistons in the two cylinders 22. This movement of the valve handle will operate the three-way valve to open conduits 31 from above the pistons to permit oil in the tops of the hydraulic cylinders 22 to flow unrestrictedly back through the return conduit 26 into the reservoir. As the pistons and stems 24 are raised by hydraulic pressure, the arms 17 and 18 on each side of the tractor are moved rearwardly of the tractor to cause elevation and rearward swinging of the bucket 10 to the dotted line position in Fig. 1 for overshot unloading.

When the valve handle 29 is moved forward beyond its neutral position, the three-way valve 27 is operated to direct the fluid under pressure from the conduit 28 through the valve and into the conduits 31 to the tops of the cylinders 22 and pistons therein to move the latter downward thereby pulling the arms 17 and 18 forwardly to swing the bucket 20 toward the front of the tractor and down to the ground ready to scoop another load. As the pistons are being forced downwardly, the fluid thereunder is forced out through the conduits 30 and through the valve 27 into the return conduit 26 to the reservoir to be recirculated as controlled by the valve handle 29.

Of course, it will be obvious that such a hydraulic system or hook-up is very flexible in its application or attachment to a tractor, in that the conduits or piping can be run around various adjuncts, to locate the components of the system where necessary and where they are convenient to the operator. Wherever necessary, any portions of these conduits may be resilient hose, as for example, where the conduits 30 and 31 connect or reach around the pivot 23 for the hydraulic cylinders 22 to permit freedom of oscillation of these cylinders during their operation. It will also be apparent that all components of the invention are of such construction that they may easily be attached to any up-to-date wheeled or other tractor, thereby providing an easy conversion of tractors into overshot loaders. The attachment casting 13, hydraulic cylinder 22 and associated arms 11, 17 and 18 together with the cylinder conduits can be conveniently arranged between the tractor chassis and the wheels, as shown.

I claim:

1. In a vehicular overshot loader having front and rear axles the combination comprising: a boom arm element having the inner end thereof pivotally connected to the vehicle adjacent its rear axle for swinging movement about an axis parallel to the latter; a bucket element carried on the outer end of said boom arm element, said bucket being normally in fixed relation to said boom arm element during operation of the loader and having a front digging edge, a rear dumping edge, and a bottom extending therebetween, said swinging movement of said boom arm element being adapted to swing said bucket element in an arc reaching from a digging position in front of the vehicle to a dumping position over the rear of the vehicle wherein said dumping edge is disposed rearwardly of the vehicle and said boom arm element is substantially vertical; a first link having one end thereof pivotally connected to the vehicle between its axles, at a relatively low level on the vehicle, and forwardly of the pivotal connection of said boom arm element to the vehicle; a second link having one end thereof pivotally connected to the other end of said first link and the other end thereof pivotally connected to one of said elements for swinging both, the pivotal connection between said first and second links forming an upwardly pointing elbow joint when said bucket element is in digging position, the sum of the lengths of said links being greater than the distance between the pivotal connection of said boom arm element to the vehicle and the pivotal connection of said second link to one of said elements; and a double-acting hydraulic cylinder member having a piston rod member extending therefrom, one of said members being pivotally connected to said first link adjacent its pivotal connection with said second link and the other of said members being pivotally connected to the vehicle forwardly of the pivotal connection of said first link to the latter and approximately on the same level therewith, said cylinder member being approximately vertical when said bucket element is in digging position.

2. The structure defined in claim 1 in which the pivotal connection of the first link to the vehicle is located rearwardly of the mid-point between the vehicle axles.

3. The structure defined in claim 1 in which the length of the first link is less than the distance between the pivotal connection of the boom arm element to the vehicle and the pivotal connection of the second link to one of the said elements.

4. The structure defined in claim 1 in which the length of the first link is greater than the distance between the pivotal connection of the boom arm element to the vehicle and the pivotal connection of said first link to the vehicle.

5. In a vehicular overshot loader having front and rear axles the combination comprising: a boom arm element having the inner end thereof pivotally connected to the vehicle adjacent its rear axle for swinging movement about an axis parallel to the latter; a bucket element adjustably carried on the outer end of said boom arm element and having a front digging edge, a rear dumping edge, and a bottom extending therebetween, said swinging movement of said boom arm element being adapted to swing said bucket element in an arc reaching from a digging position in front of the vehicle to a dumping position over the rear of the vehicle wherein said dumping edge is disposed rearwardly of the vehicle and said boom arm element is substantially vertical; a first link having one end thereof pivotally connected to the vehicle between its axles, at a relatively low level on the vehicle, and forwardly of the pivotal connection of said boom arm element to the vehicle; a second link having one end thereof pivotally connected to the other end of said first link and the other end thereof pivotally connected to one of said elements for swinging both, the pivotal connection between said first and second links forming an upwardly pointing elbow joint when said bucket element is in digging position, the sum of the lengths of said links being greater than the distance between the pivotal connection of said boom arm element to the vehicle and the pivotal connection of said second link to one of said elements; and a double-acting hydraulic cylinder member having a piston rod member extending therefrom, one of said members being pivotally connected to said first link adjacent its pivotal connection with said second link and the other of said members being pivotally connected to the vehicle forwardly of the pivotal connection of said first link to the latter and approximately on the same level therewith, said cylinder member being approximately vertical when said bucket element is in digging position.

6. In a vehicular overshot loader, as defined in claim 5, wherein said second link is pivotally connected to said bucket element.

References Cited in the file of this patent

UNITED STATES PATENTS

| Number | Name | Date |
|---|---|---|
| 2,296,827 | Andersen et al. | Sept. 29, 1942 |
| 2,304,672 | Bell | Dec. 8, 1942 |
| 2,518,096 | Thorne | Aug. 8, 1950 |
| 2,529,338 | Hoover | Nov. 7, 1950 |

FOREIGN PATENTS

| Number | Country | Date |
|---|---|---|
| 458,913 | Canada | Aug. 16, 1949 |